(12) United States Patent
Nagapudi et al.

(10) Patent No.: US 6,510,506 B2
(45) Date of Patent: Jan. 21, 2003

(54) ERROR DETECTION IN CACHE TAG ARRAY USING VALID VECTOR

(75) Inventors: Venkatesh Nagapudi, Santa Clara, CA (US); Chakravarthy Kosaraju, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 09/752,584

(22) Filed: Dec. 28, 2000

(65) Prior Publication Data

US 2002/0087825 A1 Jul. 4, 2002

(51) Int. Cl.$^7$ .......................... G06F 12/10; G06F 11/00
(52) U.S. Cl. .................. 711/205; 711/100; 711/118; 711/200; 714/48
(58) Field of Search ........................ 711/100, 118, 711/144, 145, 154, 200, 205, 206; 714/48

(56) References Cited

U.S. PATENT DOCUMENTS

| | | | | | |
|---|---|---|---|---|---|
| 5,410,668 A | * | 4/1995 | Hilton | .......................... | 711/139 |
| 5,793,941 A | * | 8/1998 | Pencis et al. | .................. | 714/5 |
| 6,216,200 B1 | * | 4/2001 | Yeager | .......................... | 711/100 |
| 6,237,079 B1 | * | 5/2001 | Stoney | .......................... | 712/34 |
| 6,349,379 B2 | * | 2/2002 | Gibson et al. | .............. | 712/210 |

* cited by examiner

*Primary Examiner*—Tuan V. Thai
(74) *Attorney, Agent, or Firm*—Blakely, Sokoloff, Taylor & Zafman LLP

(57) ABSTRACT

An embodiment of the present invention includes a tag array, a valid vector, and a detector. The tag array stores N tag entries. Each of the N tag entries contains a one-hot tag having K bits. Each of the K bits of the one-hot tag corresponds to a translation look-aside buffer (TLB) entry in a TLB array having K TLB entries. The valid vector stores N valid entries corresponding to the N tag entries. The detector detects an error when a tag entry is read out upon a fetch read operation.

24 Claims, 9 Drawing Sheets

ERROR DETECTION IN CACHE TAG ARRAY USING VALID VECTOR

BACKGROUND

1. Field of the Invention

This invention relates to computer architecture. In particular, the invention relates to cache memory.

2. Description of Related Art

Soft errors are errors caused by temporary disruption of memory cells. In high performance processors, it is desirable to reduce the soft error rate (SER) and/or the failure in time (FIT) as much as possible. Undetected soft errors in processor cache lead to corrupt data and may result in unacceptable performance. When soft errors occur in a cache internal to a processor, such as an instruction cache, the erroneous instruction code may cause damaging effects to subsequent processing units in the processing chain.

An internal cache unit usually consists of a translation look-aside buffer (TLB) unit for virtual to physical address translation and an associated tag array unit. In a typical cache access, an index portion of the virtual address is used to index the TLB unit while a tag portion is used to look up the tag array unit. The contents of the looked up tag entry from the tag array unit are compared with the indexed TLB entry to determine if the access results in a miss or a hit. If there is a soft error in the tag array, the comparison may generate incorrect result, leading to subsequent errors.

Existing techniques to reduce the SER or FIT in cache typically include use of extra hardware or redundancy such as duplicating the tag structure. These techniques have a number of drawbacks. First, the amount of overhead for the extra hardware may become large. Second, the additional circuits may consume a large amount of power. Third, the interconnections may be complex, having additional lines connecting to the word line of the memory.

DESCRIPTION OF THE DRAWINGS

The features and advantages of the present invention will become apparent from the following detailed description of the present invention in which.

DETAILED DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
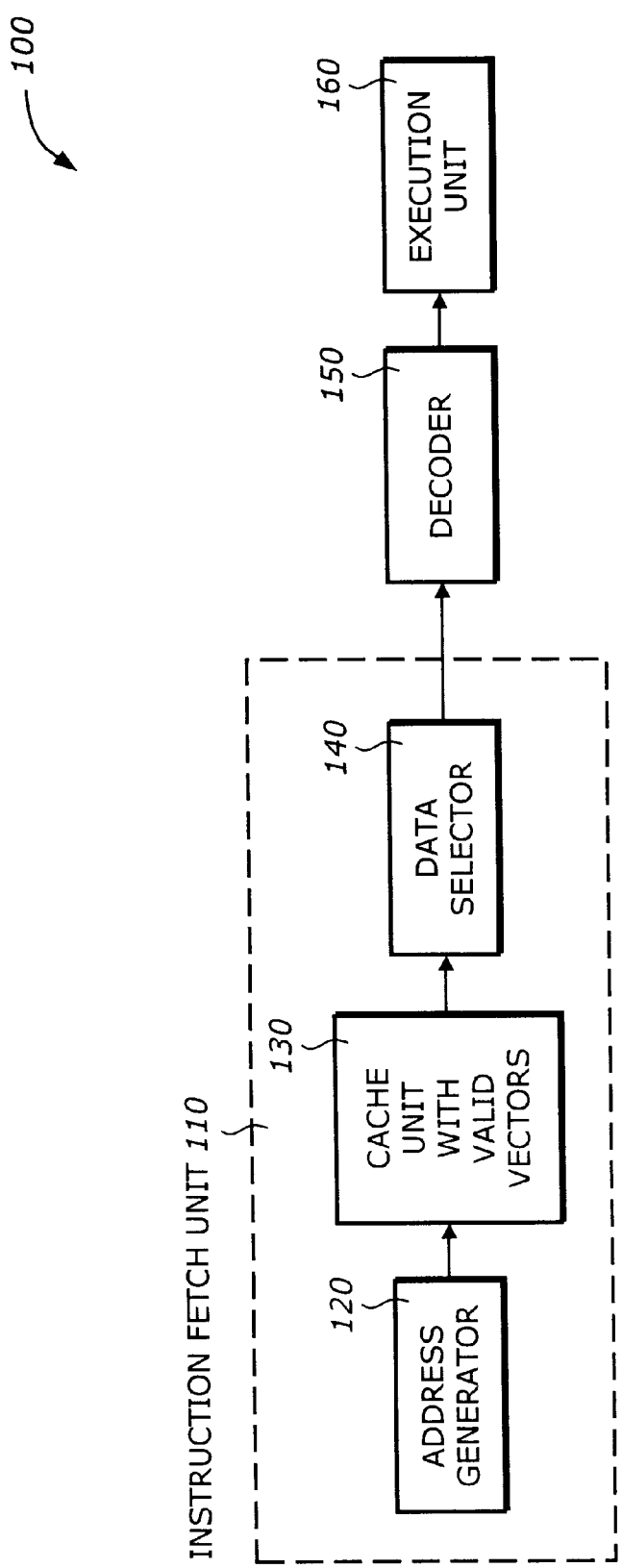
FIG. 1 is a diagram illustrating a processor in which one embodiment of the invention can be practiced.

FIG. 1 is a diagram illustrating a processor 100 in which one embodiment of the invention can be practiced. The processor 100 includes an instruction fetch unit 110, a decoder 150, and an execution unit 160. It is contemplated that the invention can be practiced with any form of cache unit including data cache, instruction cache, or any combination thereof.

The instruction fetch unit 110 fetches instructions for execution. The instruction fetch unit 110 includes an address generator 120, a cache unit with valid vector 130, and a data selector 140. There are other circuits or units that are not necessary for understanding the invention. The address generator 120 generates the address to obtain the instruction stored in the cache unit 130. The address may be a virtual address issued by the processor core, the instruction pointer, or a program counter. The cache unit 130 has valid vector(s) as part of an error detection scheme. The cache unit 130 may have a number of cache ways.

The cache unit 130 stores the instruction code and associated cache information such as tag data according to the underlying cache mapping protocol. The address may be a fill address for cache filling, a snoop address for snooping operations, a prefetch address for prefetching, and a fetch read address for fetch read operation. The virtual address may also be divided into several portions, such as an index position and a tag portion. The data selector 140 selects the cache data, in this case the instruction code, from the cache according to the way that hits the cache access.

The decoder 150 decodes the instruction code provided by the instruction fetch unit 110. The decoded instruction is delivered to various control circuits and functional units. The execution unit 160 carries out the operation(s) as decoded from the instruction using the control circuits. If the cache unit 130 has a soft error during the cache fetching cycle, the retrieved data or instruction code may have undesirable effects on the decoding and/or execution processes. It is, therefore, desirable to ensure that soft errors in the cache unit 130 are detected early to maintain data integrity.

Figure 2:
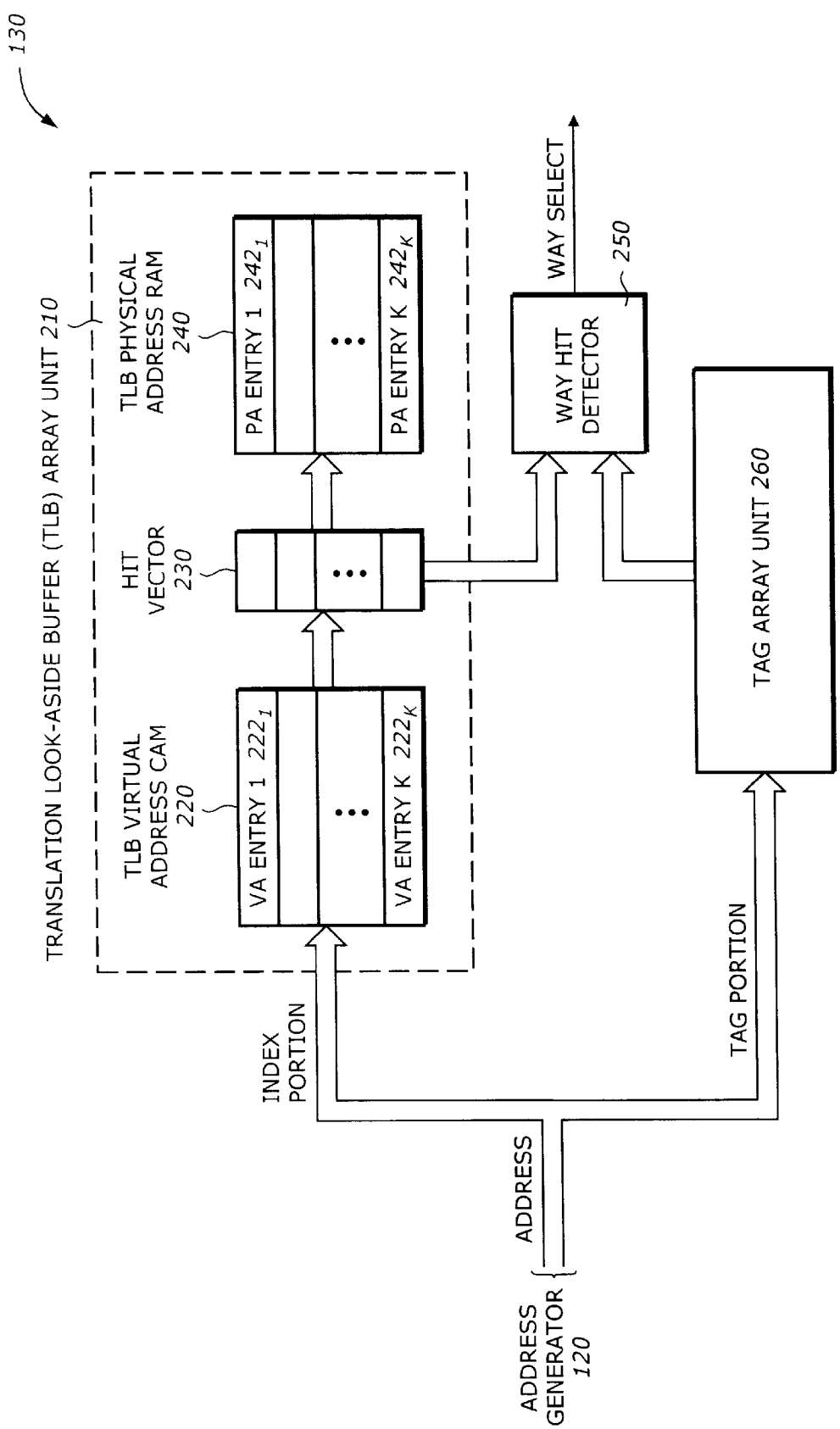
FIG. 2 is a diagram illustrating a cache unit shown in FIG. 1 according to one embodiment of the invention.

FIG. 2 is a diagram illustrating the cache unit 130 shown in FIG. 1 according to one embodiment of the invention. The cache unit 130 includes a translation look-aside buffer (TLB) array unit 210, a way hit detector 250, and a tag array unit 260.

The TLB array unit 210 includes a TLB virtual address (VA) content addressable memory (CAM) 220, a hit vector 230, and a TLB physical address (PA) random access memory (RAM) 240. Each of the TLB VA CAM 220, the hit vector 230, and the TLB PA RAM 240 has K entries where K is a whole positive integer. In one embodiment, K is a power of 2 ranging from 16 to 128 (e.g., K=32). The TLB VA CAM 220 is a CAM having K VA entries $222_1$ to $222_K$. The TLB VA CAM 220 is addressed by the index portion of the virtual address provided by the address generator 120. The K VA entries $222_1$ to $222_K$ are compared with the index portion. The hit vector 230 contains the result of the comparison or match for the TLB VA CAM 220. The hit vector 230 has K hit entries. In one embodiment, each hit entry is one bit indicating if there is a hit in the corresponding K VA entries $222_1$ to $222_K$. If there is hit, the corresponding hit entry is asserted (e.g., set to logic one). Otherwise, the corresponding hit entry is de-asserted (e.g., cleared to logic zero). The TLB PA RAM 240 has K PA entries $242_1$ to $242_K$. Each PA entry contains the physical address portion that corresponds to the index. If there is a hit, the PA entry corresponding to the asserted hit entry is read out and is used to retrieve the requested data.

The way hit detector 250 compares the hit vector 230 with the tag entries retrieved from the tag array unit 260. If there is a match, a cache hit is declared and the corresponding cache data is accessed. Otherwise, a cache miss is declared and a cache line fill is performed according to the underlying cache coherency protocol. The way hit detector 250 generates a way select vector that is used in subsequent access operations.

The tag array unit 260 contains one or more cache ways. The entries in the tag array unit 260 indicate the entries in the TLB array unit 210 that have the VA to PA translations. The tag array unit 260 is addressed by the tag portion of the virtual address.

Figure 3:
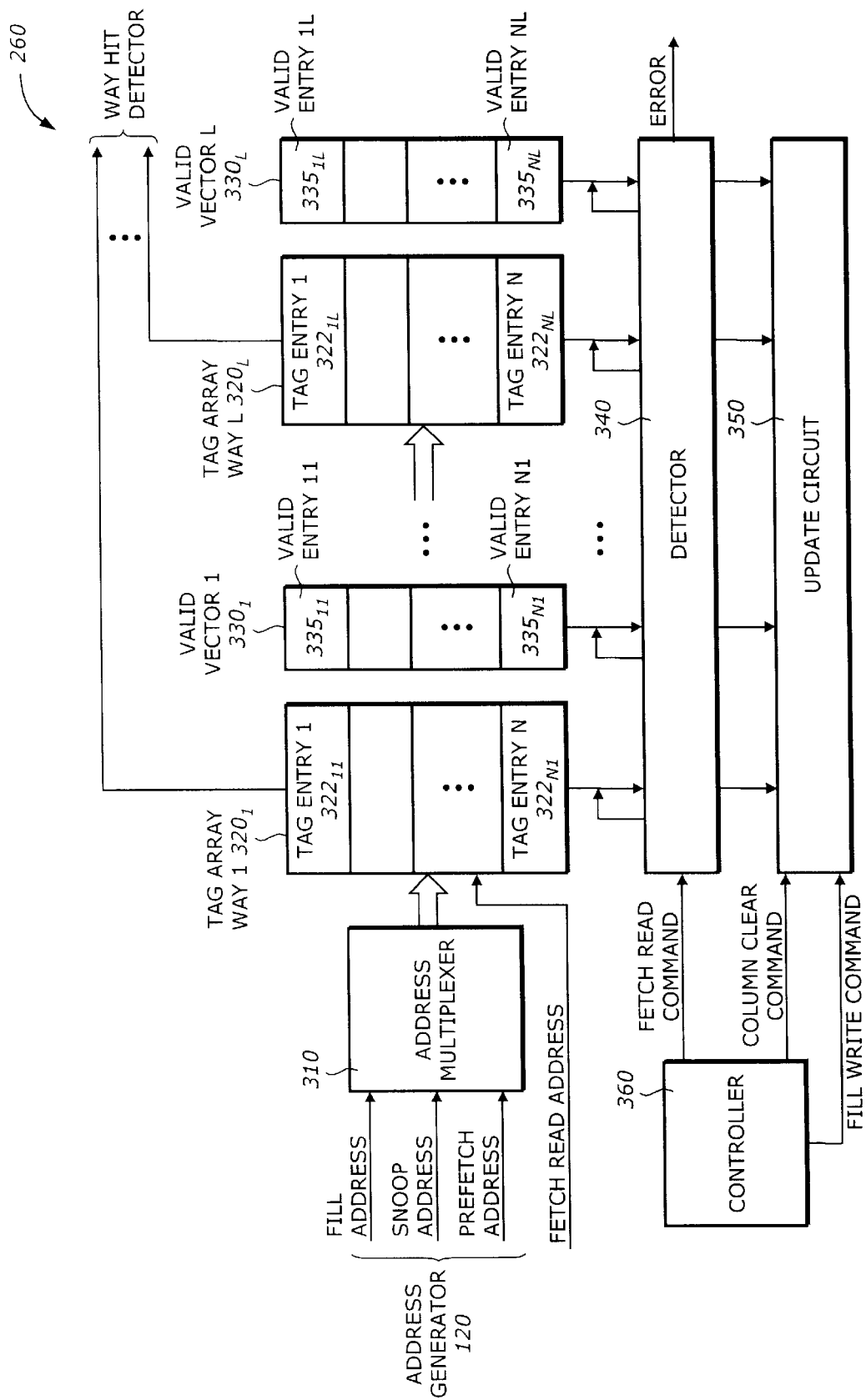
FIG. 3 is a diagram illustrating a tag array unit shown in FIG. 2 according to one embodiment of the invention.

FIG. 3 is a diagram illustrating the tag array unit 260 shown in FIG. 2 according to one embodiment of the invention. The tag array unit 260 includes an address multiplexer 310, L tag array ways $320_1$ to $320_L$, L valid vectors $330_1$ to $330_L$, a detector 340, an update circuit 350, and a controller 360.

The address multiplexer 310 selects one of a fill address, a snoop address, and a pre-fetch address, corresponding to a fill address operation, a snoop address operation, and a pre-fetch address operation, respectively. The selected address is then used to address the L tag array ways $320_1$ to $320_L$.

The L tag array ways $320_1$ to $320_L$ store the tag entries that are used to match against the hit vector 230 (FIG. 2). In one embodiment, the tag array unit 260 is organized as a 4-way set associative, therefore L=4. As is known by one skilled in the art, any other values of L can be used. The L tag array ways $320_1$ to $320_L$ are addressed by the selected address from the address multiplexer 310 and the fetch read address in a fetch read cycle. Each of the tag array ways $320_1$ to $320_L$ stores N tag entries. For example, the tag array way $320_1$ stores N tag entries $322_{11}$ to $322_{N1}$, the tag array way $320_L$ stores N tag entries $322_{1L}$ to $322_{NL}$. Each of the N tag entries contains a one-hot tag having K bits where K is a whole positive integer equal to the number of entries in the TLB array unit 210 (FIG. 2). The one-hot tag is decoded to point to a TLB entry in the TLB array unit 210. For example, the bit position of a bit in the one-hot tag indicates the entry number of the TLB array unit 210. As an example, suppose there are 32 entries in the TLB array unit 210 (i.e., K=32). Then, the one-hot tag is 32-bit where bits 0, 1, . . . k corresponds to entry numbers 0, 1, . . . k of the TLB array unit 210, respectively. Each bit in the one-hot tag is set or cleared depending on whether there is a hit or a miss in the TLB array unit 210. For example, a logic one may correspond to a hit and a logic zero may correspond to a miss.

As an illustration, suppose there are 4 ways and suppose the 4 one-hot tags for the four tag array ways in an access cycle are:

Way 1: 00000010 00000000 00000000 00000000
Way 2: 00000000 00000000 00000000 00001000
Way 3: 00000000 00000000 00000000 00000000
Way 4: 00000000 00000000 00010000 00000000

In this example, there is a TLB hit for TLB entry 25 (Way 1), entry 3 (Way 2), none (Way 3), and entry 12 (Way 4). Suppose the hit vector 230 (FIG. 2) contains the hit vector 00000000 00000000 00000000 00001000 which matches with Way 2. Then, the way hit detector 250 (FIG. 2) generates a way select vector of 0010 to indicate that there is a way hit at way 2 (way 1 is bit 0 and way 4 is bit 3). If none of the tag entries contains a hit bit, the way hit detector 250 will generates 0000. Therefore, by ORing all the bits in the way select vector, a hit or miss will be determined. If there is a hit, the corresponding cache data in the hit way will be accessed.

It is also noted that a column in the tag array way 320 corresponds to the same TLB entry. Since there are N tag entries in a tag array way, a column in the tag array way has N bits. Furthermore, since the bit position points to the entry number, the N bits of a column correspond to the same TLB entry. A column bit in a column corresponds to a set in the associated tag array way.

The L valid vectors $330_1$ to $330_L$ correspond to the L tag array ways $320_1$ to $320_L$, respectively. Each of the L valid vectors $330_1$ to $330_L$ stores N valid entries corresponding to the N tag entries in the corresponding tag array way. For L ways, there are L valid vectors each of which is associated with each way. The valid entry indicates if the corresponding one-hot tag in the tag array way has been written. When there is a fill address operation, i.e., when a new one-hot tag is written to the tag array, the corresponding valid vector is updated and the valid entry associated with the new one-hot tag is asserted. When a TLB entry is removed, the column of the tag array corresponding to that TLB entry is cleared and the associated valid entries are de-asserted. In one embodiment, the valid entry is one-bit. The valid entry is set to logic one when it is asserted and cleared to zero when it is de-asserted. Obviously, any other asserting or de-asserting logic levels can be used. A column bit may also be cleared when there is a snoop address operation. When this occurs, the corresponding valid entry is de-asserted.

The detector 340 detects an error when a tag entry in the tag array way is read out upon a fetch read operation. A soft error may flip a bit in the tag entry, i.e., changing a logic one to a logic zero and a logic zero to a logic one. For a one-hot tag, only one bit is set. If the one-hot tag has any logic one bit, the associated valid bit is logic one. If the one-hot tag contains all zero's, the associated valid bit is logic zero. Therefore, if there is a soft error that flips one bit in the one-hot tag or the valid entry, a comparison between the bits of the one-hot tag and the associated valid entry will reveal the error. If an error signal is generated by the detector 340, the processor core will enter an exception or error handling condition to service the error. The soft error is therefore confined within the instruction fetch unit and is not propagated further in the processing chain or pipeline. An error correction scheme may be developed to correct this single bit error in the one-hot tag. With this error detection and data integrity protection scheme, the soft error rate and/or the failure in time is significantly reduced. In addition, by having only a valid vector for each way in the tag array unit, the interconnection complexity is reduced significantly, resulting in efficient use of silicon area and reduced propagation delays.

The update circuit 350 updates the N valid entries in a valid vector when the associated tag array is updated. The tag array way is updated in at least one of a fill address operation, a TLB entry removal, and a snoop address operation. When a TLB entry is removed or replaced, the corresponding data stored in the cache are no longer valid because the VA to PA translation is not valid. So, all the tag entries which use the replaced TLB entry for the translation are invalidated. These entries correspond to a column in the tag array way. In the snoop address operation, the TLB VA CAM 220 (FIG. 2) is searched for the entry which holds the snooped PA. If the TLB entry is being used by a set in the tag array way as given by the stored one-hot tag matching the one-hot hit vector, then the associated tag entry is also invalidated. In other words, a column bit in the tag array of the associated set is cleared and the associated valid entry is de-asserted. In the TLB entry removal, the entire column in the tag array corresponding to the TLB entry to be removed is cleared and the valid entries for the set bits in the column to be cleared are de-asserted.

The controller 360 generates appropriate command signals to control the detector 340 and the update circuit 350. The controller 360 may generate a fetch read command to the detector 340 upon a fetch read operation, a clear column command upon a column clear operation and a fill write command upon a fill address operation to the update circuit 350.

Figures 4A, 4B:
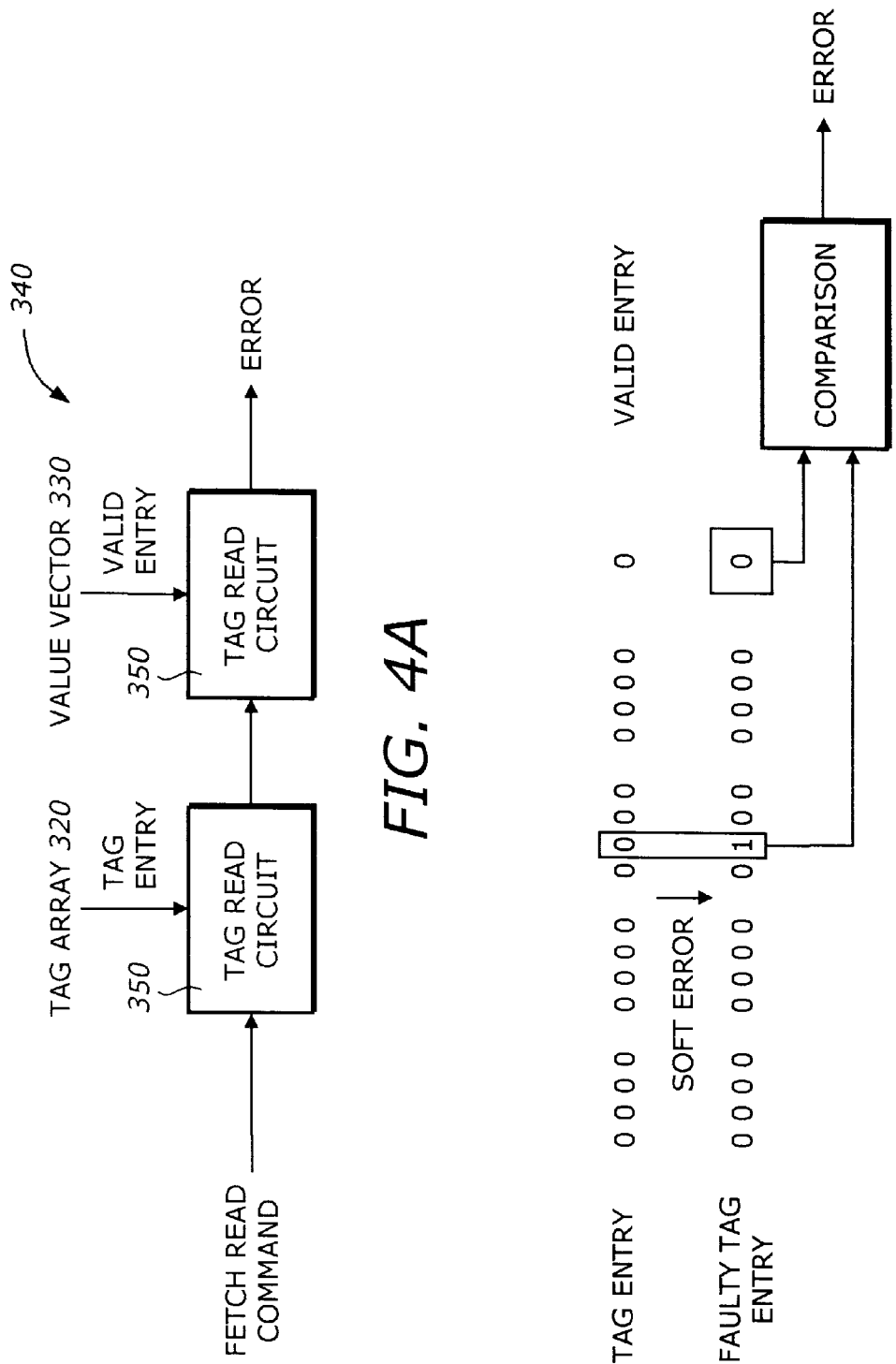
FIG. 4A is a diagram illustrating a detector shown in FIG. 3 according to one embodiment of the invention.
FIG. 4B is a diagram illustrating an example for an error detection for the detector shown in FIG. 4A according to one embodiment of the invention.

FIG. 4A is a diagram illustrating the detector 340 shown in FIG. 3 according to one embodiment of the invention. The detector 340 includes a tag read circuit 410 and a comparator 420. The detector 340 is shown representative for all tag array ways.

The tag read circuit 410 reads out one of the N tag entries from the tag array way at the fetch read address. The tag read circuit 410 receives the fetch read command from the controller 360 (FIG. 3), retrieves the addressed tag entry from the tag array way and sends to the comparator 420. The comparator 420 retrieves the valid entry from the associated valid vector and compares this valid entry with the read out tag bits in the tag entry. If the retrieved valid entry does not match the tag bits, the comparator 420 asserts the error signal, indicating a soft error condition. Otherwise, the comparator 420 de-asserts the error signal.

In one embodiment, the comparator 420 may include a K-input OR gate to OR the K bits of the retrieved tag entry. The output of the OR gate is then compared with the valid entry. If the output of the OR gate is not equal to the valid entry, the comparator 420 asserts the error signal. Otherwise, the comparator 420 de-asserts the error signal.

FIG. 4B is a diagram illustrating an example for an error detection for the detector shown in FIG. 4A according to one embodiment of the invention.

In this example, suppose the tag entry contains a one-hot tag vector of 0000 0000 0000 0000 and the associated valid entry is a logic zero indicating the tag entry is invalid and a fill address operation has been performed. Suppose a soft error causes a bit in the tag entry to flip to one. The faulty tag entry becomes, say 0000 0000 0010 0000. This tag entry is then compared with the valid entry. Since the two do not match, the comparison of the two results in an error condition.

Figure 5A:
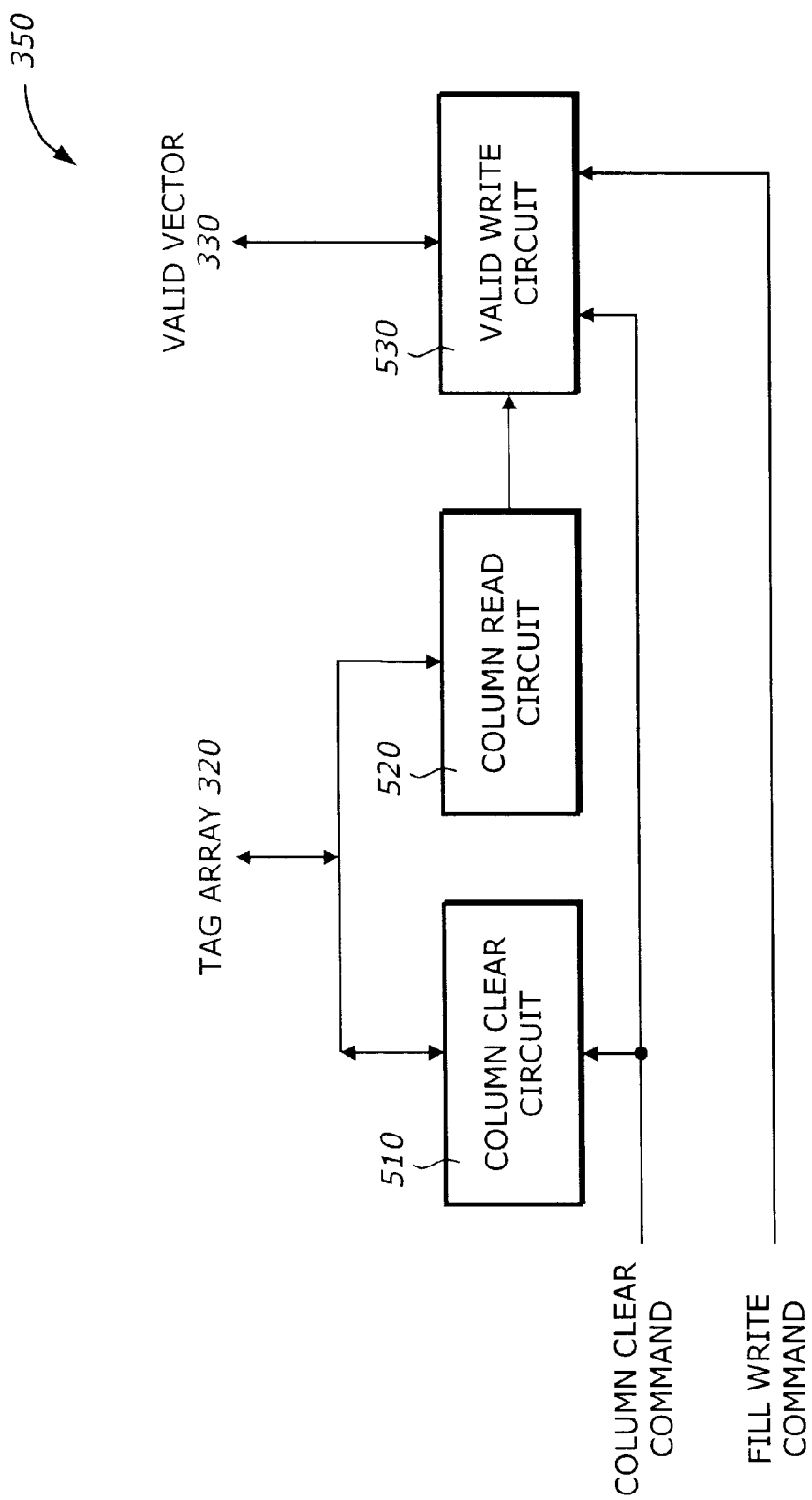
FIG. 5A is a diagram illustrating an update circuit shown in FIG. 3 according to one embodiment of the invention.

FIG. 5A is a diagram illustrating the update circuit 350 shown in FIG. 3 according to one embodiment of the invention. The update circuit 350 includes a column clear circuit 510, a column read circuit 520, and a valid write circuit 530.

The column clear circuit 510 clears the entire column or a column bit of the tag array. The column read circuit 520 reads out a column from the tag array. Column has N bits corresponding to a TLB entry in the TLB array unit 210 (FIG. 2).

The valid write circuit 530 asserts a valid entry when a corresponding one-hot tag is written at a fill address operation. The valid write circuit 530 negates a valid entry when a corresponding column bit is to be cleared, either in a TLB removal operation or a snoop address operation.

Figure 5B:
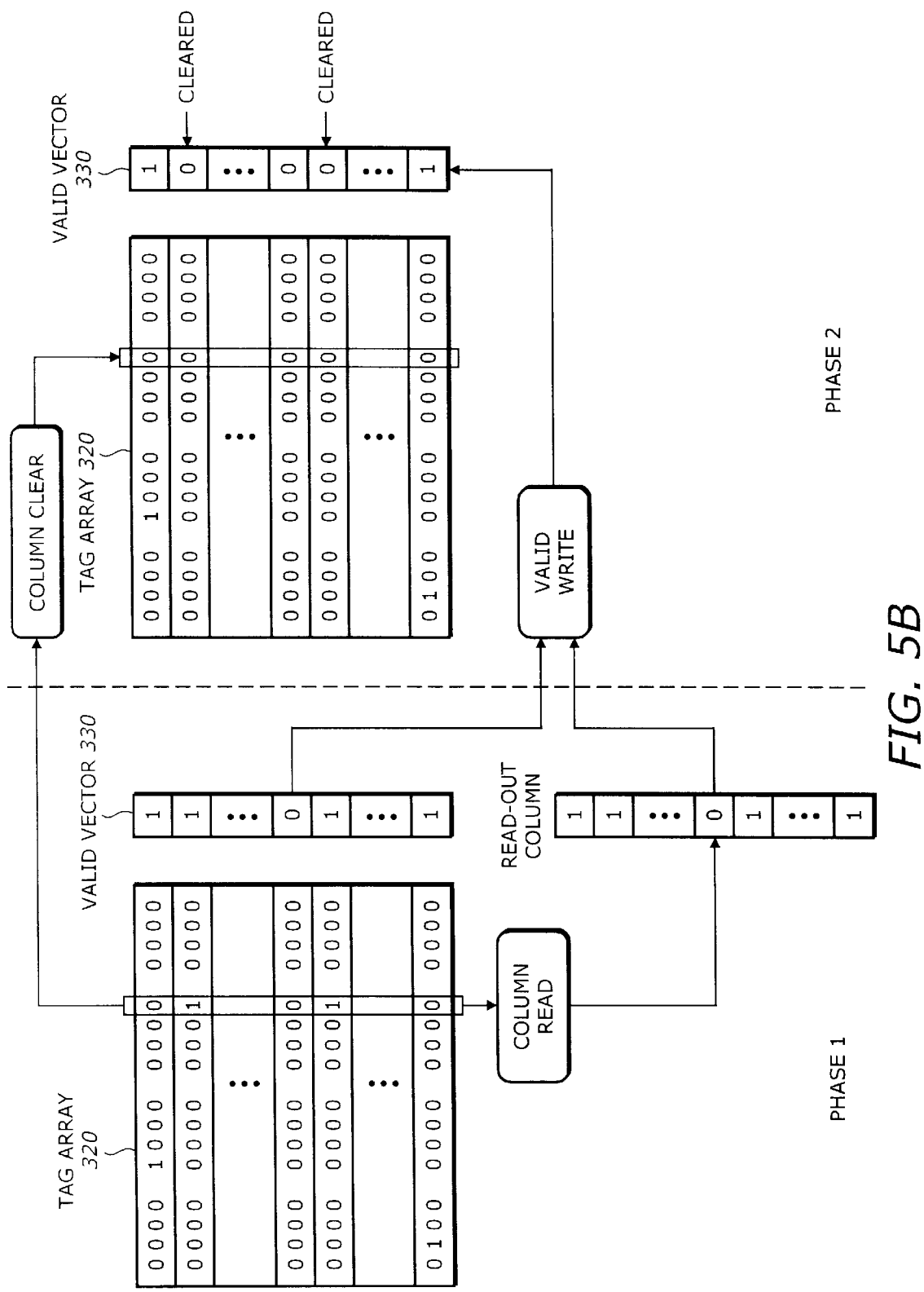
FIG. 5B is a diagram illustrating an example for an update due to a TLB entry removal according to one embodiment of the invention.

FIG. 5B is a diagram illustrating an example for an update due to a TLB entry removal according to one embodiment of the invention.

In this example, suppose there are 16 TLB entries. The word size of the one-hot tag entry in the tag array 320 is therefore 16-bit. Suppose the entries are as shown. The valid vector 330 contains valid bits reflecting the contents of the associated tag entries. The valid entry of the valid vector 330 is a logic one if any one of the bits of the corresponding one-hot tag is a logic one. The valid entry of the valid vector 330 is a logic zero if all the bits of the corresponding one-hot tag are zero. Suppose the TLB entry number 4 is removed.

The update takes place in two phases. In the first phase, the entire column at the bit position 4 corresponding to the TLB entry number 4 is read out by the column read operation. In the second phase, the valid vector 330 is compared with the read out column. The valid vector is updated by changing the valid bits corresponding to the one-bits in the read out column. This update process is logically equivalent to an exclusive-or (XOR) operation between the valid vector 330 and the read-out column. The result of this XOR operation is then written back to the valid vector 330. The column at the bit position 4 in the tag array 320 is then cleared by the column clear operation.

Figure 5C:
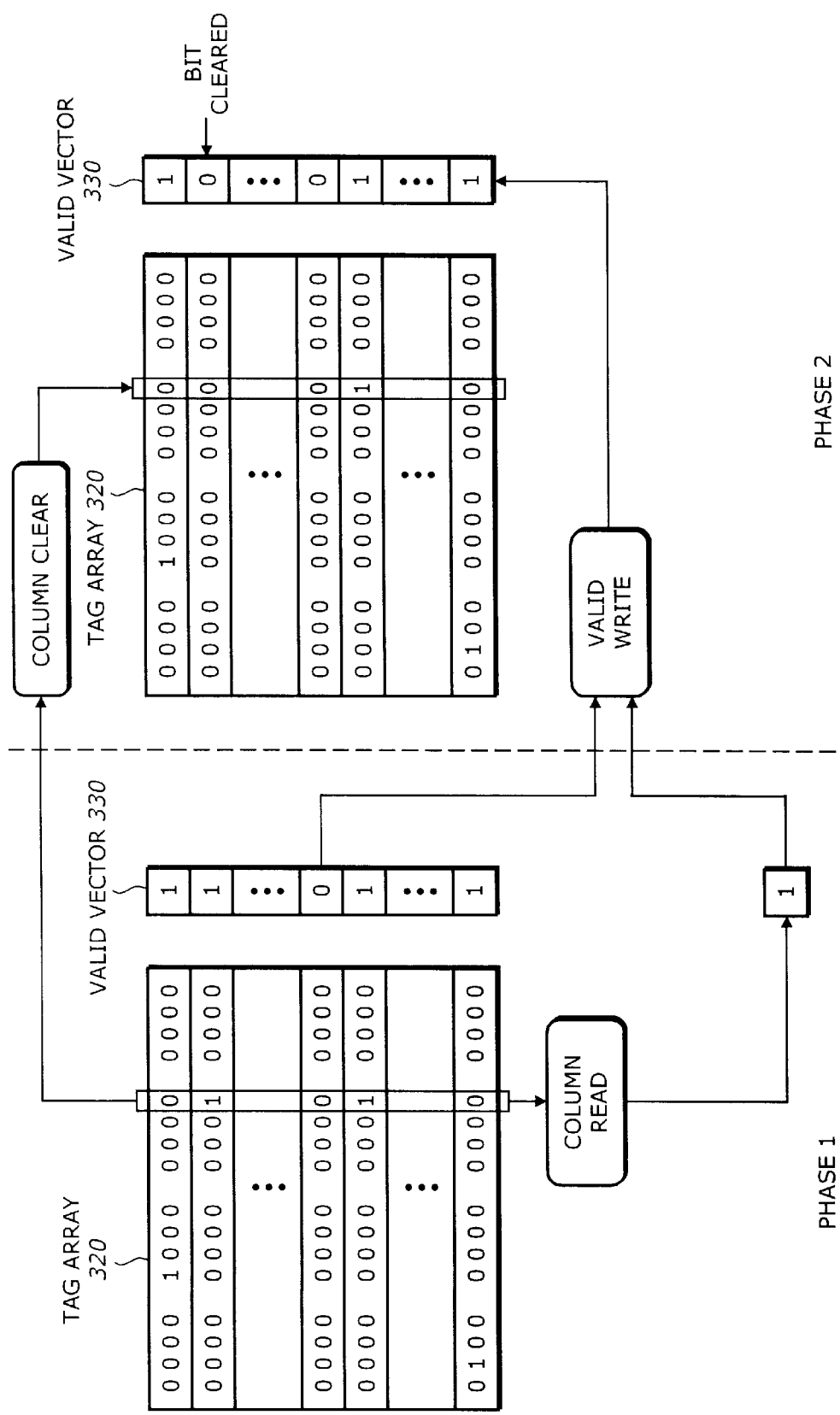
FIG. 5C is a diagram illustrating an example for an update due to a snoop address operation according to one embodiment of the invention.

FIG. 5C is a diagram illustrating an example for an update due to a snoop address operation according to one embodiment of the invention.

In this example, the original contents of the tag array 320 and the valid vector 330 are the same as in the example of FIG. 5B. This update also takes place in two phases. In the first phase, a column read operation is performed to read out a column bit corresponding to the set of the snoop address. In the second phase, this column bit is compared with the corresponding bit of the valid vector. A valid entry update is performed to clear the corresponding valid bit. This can be performed by XORing the read-out column bit and the corresponding valid bit in the valid vector 330. Other bits in the valid vector 330 remain unchanged. Then, the column bit in the tag array is cleared by a column clear operation.

Figure 6:
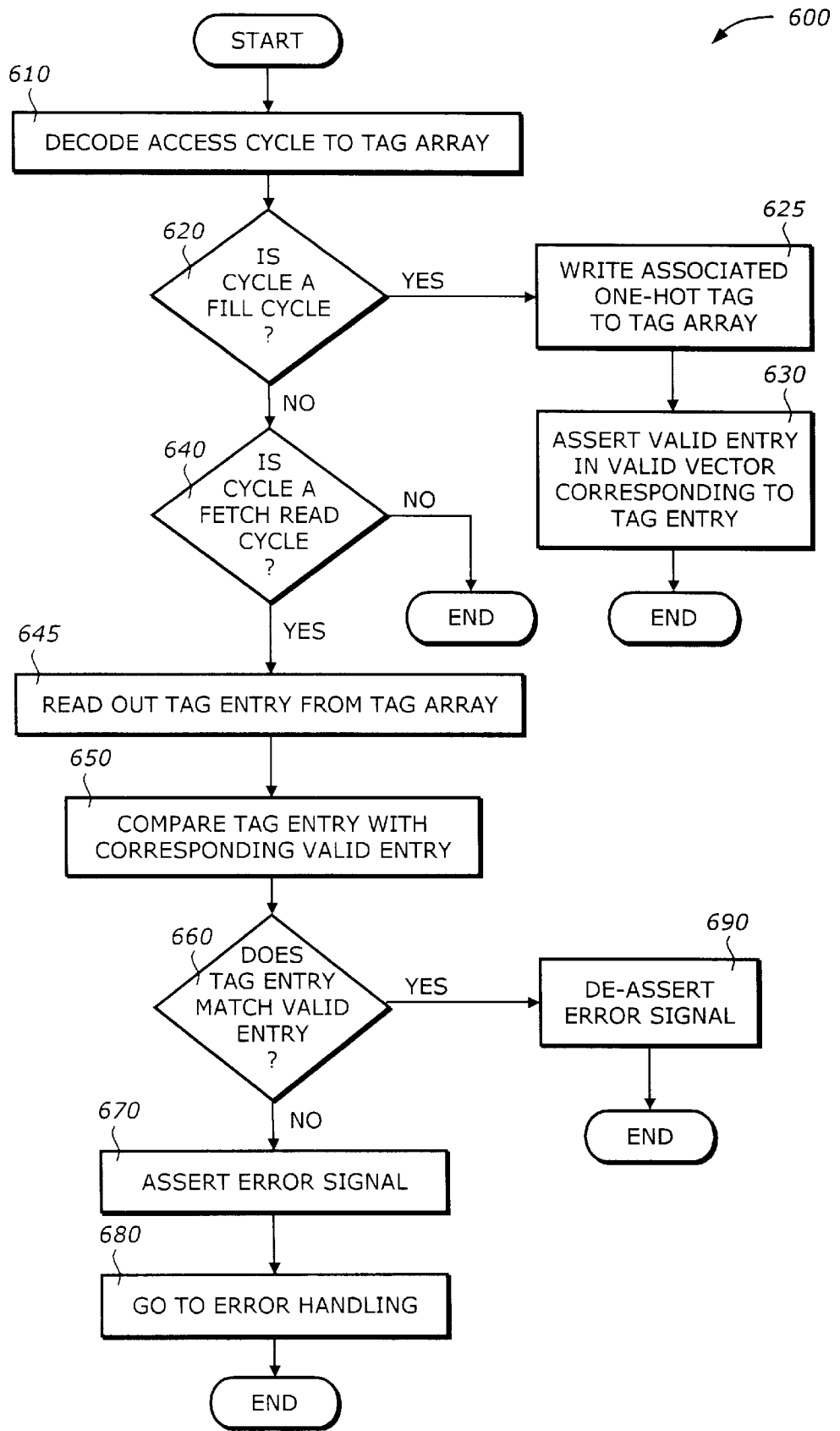
FIG. 6 is a flow chart illustrating a process for a tag array access according to one embodiment of the invention.

FIG. 6 is a flow chart illustrating a process 600 for a tag array access according to one embodiment of the invention.

Upon START, the process 600 decodes the type of the access cycle or operation to the tag array (Block 610). The process 600 determines if the cycle is a fill cycle or a fill address operation (Block 620). If so, the process 600 writes the associated one-hot tag to the tag array (Block 625) and then asserts the valid entry in the valid vector corresponding to the tag entry (Block 630).

If the cycle is not a fill cycle, the process 600 determines if the cycle is a fetch read cycle (Block 640). If not, the process 600 is terminated. Otherwise, the process 600 reads out the tag entry from the tag array (Block 645). Then, the process 600 compares the tag entry with the corresponding valid entry (Block 650).

Next, the process 600 determines if the tag entry matches the valid entry (Block 660). If so, the process 600 de-asserts the error signal (Block 690) and is then terminated. Otherwise, the process 600 asserts the error signal (Block 670). Then, the process 600 goes to an appropriate error handling routing or operation (Block 680) and is then terminated.

Figure 7:
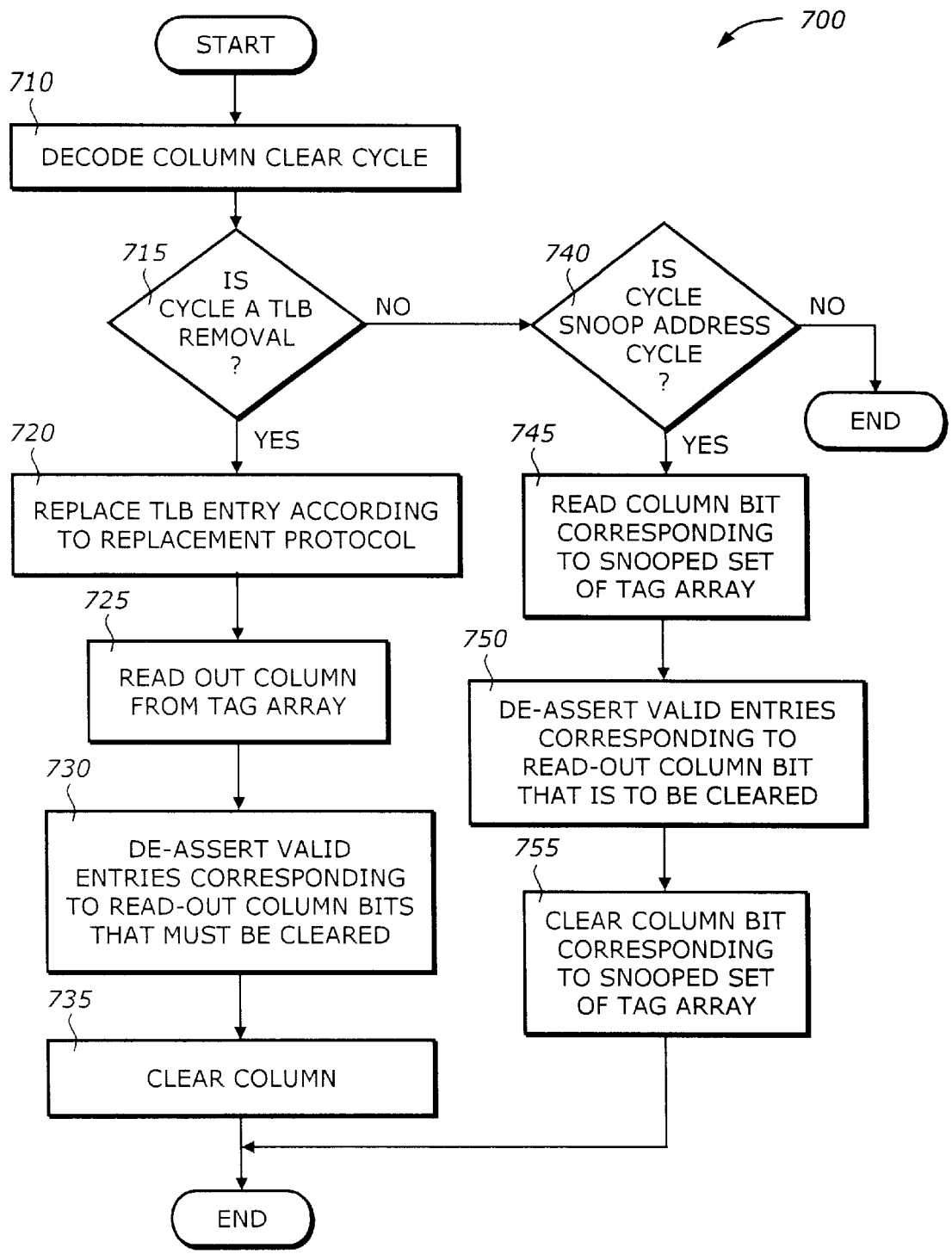
FIG. 7 is a flow chart illustrating a process for a column clear according to one embodiment of the invention.

FIG. 7 is a flow chart illustrating a process 700 for a column clear according to one embodiment of the invention.

Upon START, the process 700 decodes the column clear cycle (Block 710). Then, the process 700 determines if the cycle is a TLB removal (Block 715). If so, the process 700 replaces the TLB entry according to the underlying replacement protocol (Block 720). Then, the process 700 reads out the column from the tag array (Block 725). Next, the process 700 de-asserts the valid entries corresponding to the read-out column bits that are going to be cleared (Block 730). The process 700 then clears the column (Block 735) and is then terminated.

If it is determined that the cycle is not a TLB removal, the process 700 determines if the cycle is a snoop address cycle (Block 740). If not, the process 700 is terminated. Otherwise, the process 700 reads the column bit corresponding to the snooped set of the tag array (Block 745). Then, the process 700 de-asserts the valid entries corresponding to the read-out column bit that is going to be cleared (Block 750). Next, the process 700 clears the column bit corresponding to the snooped set (Block 755) and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:

a tag array to store N tag entries, each of the N tag entries containing a one-hot tag having K bits, each of the K bits of the one-hot tag corresponding to a translation look-aside buffer (TLB) entry in a TLB array having K TLB entries;

a valid vector to store N valid entries corresponding to the N tag entries; and a detector coupled to the tag array and the valid vector to detect an error when a tag entry is read out upon a fetch read operation;

an update circuit coupled to the valid vector to update the N valid entries when the tag array is updated, wherein the update circuit comprises:

a column read circuit to read out a column having N column bits in the tag array, the N column bits in the column corresponding to a TLB entry in the TLB array;

a valid write circuit to assert a valid entry when a corresponding one-hot tag is written at a fill address operation and to negate a valid entry when a corresponding column bit is to be cleared; and a column clear circuit to clear the column when the corresponding TLB entry is removed.

2. The apparatus of claim 1 wherein the column clear circuit clears a column bit when there is a snoop access to the corresponding TLB entry used in a set in a snoop address operation.

3. The apparatus of claim 1 wherein the detector comprises:

a tag read circuit to read out one of the N tag entries; and a comparator coupled to the tag read circuit to compare the read-out one of the N tag entries with the corresponding valid entry in the valid vector.

4. The apparatus of claim 3 wherein the comparator asserts an error signal if the read-out one of the N tag entries does not match with the corresponding valid entry in the valid vector.

5. The apparatus of claim 1 wherein each of the N valid entries is one-bit.

6. The apparatus of claim 1 further comprises:

an address multiplexer coupled to the tag array to select one of a fill address, a snoop address, and a pre-fetch address, corresponding to a fill address operation, a snoop address operation, and a pre-fetch address operation, respectively.

7. The apparatus of claim 1 wherein the tag array and the TLB array correspond to a cache unit internal to a processor.

8. The apparatus of claim 1 wherein K TLB entries are at least ones of K TLB virtual address (VA) entries in a VA content addressable memory (CAM) and K TLB physical address (PA) entries in a PA random access memory (RAM).

9. A method comprising:

storing N tag entries in a tag array, each of the N tag entries containing a one-hot tag having K bits, each of the K bits of the one-hot tag corresponding to a translation look-aside buffer (TLB) entry in a TLB array having K TLB entries;

storing N valid entries corresponding to the N tag entries in a valid vector; and detecting an error when a tag entry is read out upon a fetch read operation by a detector;

updating the N valid entries when the tag array is updated, wherein updating comprises:

reading out a column having N column hits in the tag array, the N column bits in the column corresponding to a TLB entry in the TLB array;

asserting a valid entry when a corresponding one-hot tag is written at a fill address operation;

negating a valid entry when a corresponding column bit is to be cleared, and clearing the column when the corresponding TLB entry is removed.

10. The method of claim 11 wherein clearing the column comprises clearing a column bit when there is a snoop access to the corresponding TLB entry used in a set in a snoop address operation.

11. The method of claim 9 wherein detecting comprises:

reading out one of the N tag entries; and comparing the read-out one of the N tag entries with the corresponding valid entry in the valid vector.

12. The method of claim 11 wherein comparing comprises asserting an error signal if the read-out one of the N tag entries does not match with the corresponding valid entry in the valid vector.

13. The method of claim 9 wherein each of the N valid entries is one-bit.

14. The method of claim 9 further comprises:

selecting one of a fill address, a snoop address, and a pre-fetch address, corresponding to a fill address operation, a snoop address operation, and a prefetch address operation, respectively.

15. The method of claim 9 wherein the tag array and the TLB array correspond to a cache unit internal to a processor.

16. The method of claim 9 wherein K TLB entries are at least ones of K TLB virtual address (VA) entries in a VA content addressable memory (CAM) and K TLB physical address (PA) entries in a PA random access memory (RAM).

17. A processor comprising:

an address generator to generate an address; and a cache unit coupled to the address generator, the cache unit comprising:

a translation look-aside buffer (TLB) array having K TLB entries;

a tag array to store N tag entries, each of the N tag entries containing a one-hot tag having K bits, each of the K bits of the one-hot tag corresponding to one of the K TLB entries in the TLB array, a valid vector to store N valid entries corresponding to the N tag entries, and a detector coupled to the tag array and the valid vector to detect an error when a tag entry is read out upon a fetch read operation;

an update circuit coupled to the valid vector to update the N valid entries when the tag array is updated, wherein the update circuit comprises:

a column read of circuit to read out a column having column bits in the tag array, the N column bits in the column corresponding to a TLB entry in the TLB array;

a valid write circuit to assert a valid entry when a corresponding one-hot tag is written at a fill address operation and to negate a valid entry when a corresponding column bit is to be cleared; and a column clear circuit to clear the column when the corresponding TLB entry is removed.

18. The processor of claim 17 wherein the column clear circuit clears a column bit when there is a snoop access to the corresponding TLB entry used in a set in a snoop address operation.

19. The processor of claim 17 wherein the detector comprises:

a tag read circuit to read out one of the N tag entries; and a comparator coupled to the tag read circuit to compare the read-out one of the N tag entries with the corresponding valid entry in the valid vector.

20. The processor of claim 19 wherein the comparator asserts an error signal if the read-out one of the N tag entries does not match with the corresponding valid entry in the valid vector.

21. The processor of claim 17 wherein each of the N valid entries is one-bit.

22. The processor of claim 17 wherein the cache unit further comprises:

an address multiplexer coupled to the tag array to select one of a fill address, a snoop address, and a pre-fetch address, corresponding to a fill address operation, a snoop address operation, and a pre-fetch address operation, respectively.

23. The processor of claim 17 wherein the cache unit further comprises:

a hit vector coupled to the TLB array to store N hit entries corresponding to hit result of an access.

24. The processor of claim 17 wherein TLB array comprises:

a virtual address (VA) content addressable memory (CMA) including K TLB entries; and a physical address (PA) random access memory (RAM) including TLB PA entries.

* * * * *